Feb. 25, 1941.    C. D. LOWRY    2,232,793
AUXILIARY DIVISION BAR FOR SASH OR STORE FRONT CONSTRUCTIONS
Filed Aug. 2, 1937
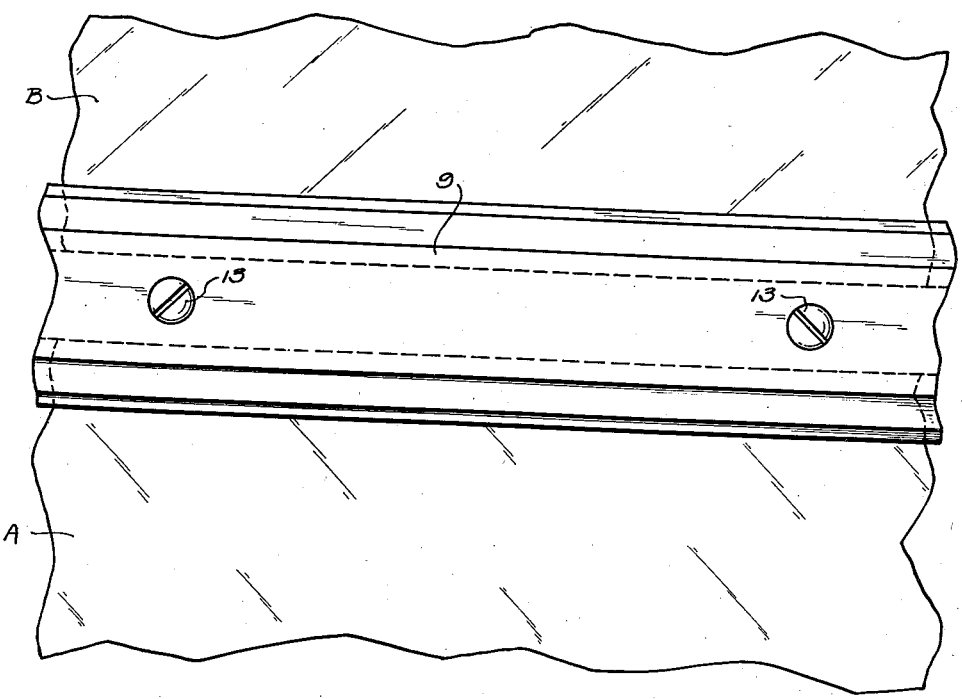
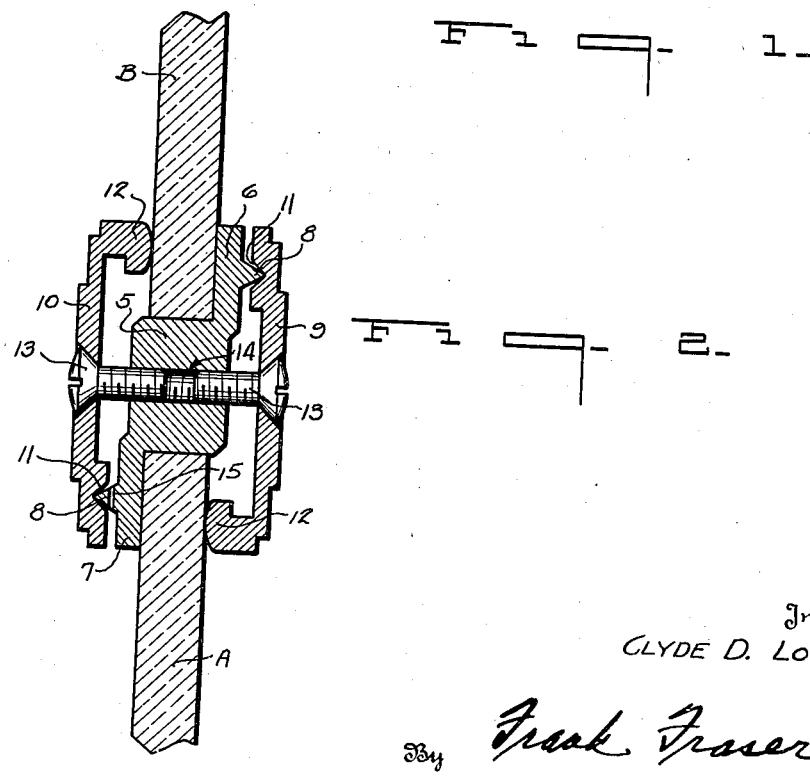
Inventor
CLYDE D. LOWRY.
By Frank Fraser,
Attorney Patented Feb. 25, 1941

2,232,793

UNITED STATES PATENT OFFICE 2,232,793

AUXILIARY DIVISION BAR FOR SASH OR STORE FRONT CONSTRUCTIONS

Clyde D. Lowry, Toledo, Ohio, assignor to Libbey-Owens-Ford Glass Company, Toledo, Ohio, a corporation of Ohio Application August 2, 1937, Serial No. 156,890

7 Claims. (Cl. 189—78)

The present invention relates to an auxiliary division bar for sash or store front constructions.

Quite often in sash and store front constructions, it is necessary or desirable to glaze the opening with a plurality of sheets of glass rather than with a single plate of glass. In these cases, a so-called auxiliary division bar is employed, and an object of the present invention is to provide an auxiliary division bar so that two or more sheets of glass may be placed in the same plane, the construction and operation of said division bar being such that one sheet of glass can be installed and removed without the necessity of moving the other sheet or sheets of glass. When the division bar is used as a horizontal division bar with a sheet of glass arranged above and below the same, either one of the two sheets of glass can be put into place or removed from its normal position without affecting the other. In this case the horizontal division bar not only serves as a seat and holding means for the upper edge of the lower sheet of glass, but also is used as a support or load bearing seat for the lower edge of the upper sheet of glass.

Broadly speaking, my improved auxiliary division bar consists generally of a body portion with diametrically opposed extensions on opposite sides thereof, each of said extensions being provided preferably with pivot means whereby face members may be pivotally associated with said body portion, with adjusting means extending through said face members and into the body portion to hold the face or cover members in operative position. It will be understood that the face members are pivotally associated with the body portion and when moved into sheet glass holding position by means of the adjusting members, the glass sheets are held against accidental displacement regardless of the thickness of the glass sheet. The face members are of suitable design to fit in with the general architecture of the sash or store front mounting. Either of the two face members can be removed from glass holding position without affecting the normal glass holding relationship of the other face member and of course when a face member is removed, the sheet of glass normally held thereby can be taken from its opening for any purpose and the same or a new sheet of glass put into the opening.

Other objects and advantages of the invention will become more apparent during the course of the following description when taken in connection with the accompanying drawing.

In the drawing wherein like numerals are employed to designate like parts throughout the same:

Fig. 1 is a fragmentary elevation showing the division bar in use as a horizontal auxiliary bar, and Fig. 2 is a vertical transverse section therethrough.

As shown in both figures, there are two sheets of glass A and B, and assuming the sheets of glass as installed in a store front, the plate A may be considered as the store front proper while the plate B may be considered as a transom or upper portion of the store front. As is well understood in the art, large plates of glass are more costly per square foot than smaller plates of glass which is an item for consideration when relatively large store fronts are to be glazed with plate glass. Also, by making use of horizontal auxiliary division bars, there is normally less danger of glass breakage due to wind storms and the like when two or more sheets of glass are held in place by means of these division bars than when a single sheet of glass is used. Again, it is possible to put advertising displays or similar inscriptions upon the upper sheet of glass B and to then change the plate of glass B at will without disturbing the lower or main part of the store front.

As shown more clearly in Fig. 2, the division bar consists of a body portion 5 having formed integrally therewith the diametrically opposed extensions 6 and 7 extending from opposite sides of the body member. Broadly speaking, the body portion may be said to be Z-shaped in cross section and each of the extensions 6 and 7 carries the outwardly extending fulcrums 8. The body portion as well as the face members may be of extruded metal such as aluminum alloy, and the fulcrums are preferably pointed as illustrated, although this is not necessary as any suitable projection or means to permit pivotal association of the face members with the body portion can be used.

The face members 9 and 10 each have a recess 11 formed on their inner faces to serve as a seat for the pivot portion 8. The outside profile of the face members may be varied to suit any type of architecture. Each face member has an inturned, preferably rounded end 12 adapted to engage the glass sheet to be held in position, the face members being put into operative association by means of the adjusting members 13 extending through properly countersunk openings in the face members and being received in the threaded opening 14 of the body portion. The adjusting member 13 can well be threaded bolts, and a single opening 14 will accommodate the adjusting members coming in from opposite face members.

The construction shown is such that varying thicknesses of glass can be mounted in the same auxiliary division bar in view of the pivotal mounting of the face members upon the body portion. Likewise, the thickness of the sheet of glass A can be different from that of the thickness of glass sheet B as the operation of one face member does not interfere with or affect the operation of the other face member.

The division bar is mounted at its ends in any convenient or satisfactory manner, the particular method of mounting or association of the ends of the division bar with the remainder of the mounting not being a part of the present invention. It will be seen that the body portion 6 is arranged above the lower sheet of glass A, thus creating a seat for the upper edge of the glass, the glass being held against the extension 7 and upon adjustment of the bolt 13 with consequent rocking of the face member upon its fulcrum support, the curved end 12 of the face member 9 is brought into engagement with the glass sheet holding it in its proper position. As is obvious upon removal of all of the adjusting members 13, the face member can be entirely removed from the body portion.

The body member also serves as a support for the upper sheet of glass 12 which is held against the upstanding extension 6 by means of the face member 10 which is operated in just the same way as the face member 9.

The three sections 6, 9 and 10 can, as already stated, be an extruded metal formed into suitable lengths, cut to fit on the job, with each of the sections being provided with spaced openings for the bolts 13, so that regardless of the length of division bar necessary, the openings for the bolts will be available. While cushioning means and gaskets are not illustrated, their use is contemplated.

When the division bar is used for outside openings such as in store fronts, the face member 10, shown in Fig. 2, is arranged exteriorly of the opening, and the fulcrum 8 upon which the face member 10 is mounted is provided with drainage openings 15. Obviously, the drainage openings could be arranged otherwise, but I have found it convenient to have them extend through the extensions or fulcrum supports in the manner shown. It will likewise be noted that the fulcrum is disposed beneath the upper edge of the lower sheet of glass A, with the result that any possible water leaking past the rounded end 12 of the face member 10 is permitted to drain out through the openings 15, thus avoiding possibility of moisture collection and consequent leakage of water between the glass, running down the inner surface of the glass sheets. This weather-proof feature is decidedly important and is made possible by the construction and arrangement of the elements such as shown in the drawings. I have found that with this type of construction, it is practically impossible for water to crawl back inside either at the bottom of the top light of glass B or at the top of the bottom light of glass A.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:
1. A division bar for sash or store front constructions adapted to receive and hold adjacent edges of two sheets of glass arranged in the same plane, comprising a body portion having diametrically opposed seats at opposite sides thereof for receiving the adjacent edges of two sheets of glass arranged in the same plane, one of said seats engaging one face of one sheet of glass and the other seat engaging the opposite face of the second sheet of glass, a face member pivotally associated with each side of said body portion, and an independent adjusting member for each of said face members for controlling the relative position of the face members with respect to the body portion to hold said sheets of glass in position.

2. A division bar for sash or store front constructions adapted to receive and hold adjacent edges of two sheets of glass arranged in the same plane, comprising a body portion having diametrically opposed sheet receiving seats, an outwardly extending fulcrum carried by each side of said body portion, a face member pivotally associated with each of said fulcrums, and an individual adjusting member for each face member passing therethrough and received in said body portion to hold said glass sheets in their respective seats.

3. A division bar for sash or store front constructions adapted to receive and hold adjacent edges of two sheets of glass arranged in the same plane, comprising a body portion having a threaded opening passing transversely therethrough, diametrically opposed pivot portions formed integrally with the body portion, a face member mounted upon one of said pivot members, a threaded adjusting member passing through the face member and received within the threaded opening of the body portion for rocking the face member into glass holding position, and a second face member pivotally associated with the other pivot member and a second adjusting member for said second face member.

4. A horizontal division bar of the character described adapted to receive and hold adjacent edges of two sheets of glass arranged in the same plane, comprising a body portion having diametrically opposed sheet receiving seats, a face member pivotally associated with each side of said body portion, the exteriorly disposed face member being pivotally associated with said body portion at a point below the edges of both sheets of glass, and individual adjusting members for each face member for rocking the same into glass holding position, said division bar being provided with drainage openings near the lowermost portion thereof.

5. A horizontal division bar of the character described adapted to receive and hold adjacent edges of two sheets of glass arranged in the same plane, comprising a body portion having diametrically opposed sheet receiving seats, an outwardly extending fulcrum carried by each side of said body portion, the fulcrum extending exteriorly of the glass sheets being disposed in a plane beneath the adjacent edges of the glass sheets and having substantially vertically disposed drainage openings extending therethrough, a face member pivotally associated with each of said fulcrums, and an individual adjusting member for each face member passing therethrough and received in said body portion to hold said glass sheets in their respective seats.

6. A division bar for sash or store front constructions adapted to receive and hold adjacent edges of two sheets of glass arranged in the same plane, comprising a substantially Z-shaped body portion providing diametrically opposed seats for receiving the adjacent edges of two sheets of glass arranged in the same plane, one of said seats engaging one face of one sheet of glass and the other seat engaging the opposite face of the second sheet of glass, a face member pivotally associated with each side of said body portion, and means for connecting said face members with said body portion and for adjusting them with respect thereto to hold said sheets of glass in position.

7. A division bar for sash for store front constructions adapted to receive and hold adjacent edges of two sheets of glass arranged in the same plane, comprising a substantially Z-shaped body portion providing diametrically opposed seats for receiving the adjacent edges of two sheets of glass arranged in the same plane, one of said seats engaging one face of one sheet of glass and the other seat engaging the opposite face of the second sheet of glass, an outwardly extending fulcrum carried by each seat, a face member pivotally associated with each of said fulcrums, and an individual adjusting member for each face member passing therethrough and received in said body portion to hold said sheets of glass in their respective seats.

CLYDE D. LOWRY.